United States Patent [19]

Hornbaker et al.

[11] Patent Number: 4,526,923
[45] Date of Patent: * Jul. 2, 1985

[54] POLYETHYLENE TEREPHTHALATE BLENDS

[75] Inventors: Edwin D. Hornbaker; Jesse D. Jones, both of Baton Rouge, La.

[73] Assignee: Ethyl Corporation, Richmond, Va.

[ * ] Notice: The portion of the term of this patent subsequent to Aug. 24, 1999 has been disclaimed.

[21] Appl. No.: 600,311

[22] Filed: Apr. 18, 1984

Related U.S. Application Data

[63] Continuation-in-part of Ser. No. 162,138, Jun. 23, 1980, abandoned.

[51] Int. Cl.$^3$ .............................................. C08L 51/00
[52] U.S. Cl. .................................... 524/502; 524/449; 524/504; 524/513; 525/64; 525/68; 525/75; 525/78; 525/80; 525/84; 525/95; 525/176

[58] Field of Search .................... 525/176, 64, 68, 75, 525/78, 80, 84, 95; 524/449, 502, 504, 513

[56] References Cited

U.S. PATENT DOCUMENTS 4,346,195  8/1982  Hornbaker et al. ................ 525/176

Primary Examiner—Jacob Ziegler
Attorney, Agent, or Firm—Donald L. Johnson; John F. Sieberth; E. Donald Mays

[57] ABSTRACT

Thermoplastic molding compositions comprising, in intimate admixture, 10 to 90 weight percent of polyethylene terephthalate and from 90 to 10 percent of a copolymer of a vinyl aromatic compound and an α,β-unsaturated cyclic anhydride. These compositions display desirable thermal properties, particularly elevated heat distortion temperatures.

18 Claims, No Drawings

POLYETHYLENE TEREPHTHALATE BLENDS

REFERENCE TO RELATED APPLICATION

This is a continuation-in-part of our prior copending application Ser. No. 162,138, filed June 23, 1980 and now abandoned.

BACKGROUND

Polyethylene terephthalate (PET) has achieved considerable importance as a raw material for the preparation of moldings, film and fibers. Preparation of PET is described inter alia in Whinfield et al., U.S. Pat. No. 2,465,319 and in Pengilly, U.S. Pat. No. 3,047,539, and in Kirk-Othmer, *Encyclopedia of Chemical Technology*, Second Edition, Vol. 16, pp. 159 et. seq. (1968), all disclosures being incorporated herein by reference.

Many applications for injection and extrusion molded parts require resistance to elevated temperatures, and it is in such applications where PET manifests certain undesirable physical characteristics. Unreinforced PET has been of very limited interest for injection and extrusion molded parts due to its low HDT (Heat Deflection Temperature, also sometimes referred to as Heat Distortion Temperature). For example, PET has an HDT of about 75° C. at 264 psi. HDT is a measure of an important thermal property of a thermoplastic material wherein a bar of the material, held in flexure under constant load (usually at 264 or 66 psi), deforms a specified amount and the temperature at which this specified deformation occurs is the HDT—see Billmeyer, *Textbook of Polymer Science*, p. 112, John Wiley and Sons, Inc. (1962).

U.S. Pat. No. 3,644,574 discloses blends of 1,4-butanediol polyesters with from about 1 to about 40 weight percent of a vinyl aromatic polymer (e.g. a styrenic polymer) which polymer may be, inter alia, a copolymer with maleic anhydride. The blends of this patent exhibit increased HDT over the unblended polyester. However, that patent discloses at column 1, lines 42–47 that the improvements observed with polybutylene terephthalate are not obtained when the polyester is poly(ethylene terephthalate).

SUMMARY OF THE INVENTION

The present invention provides thermoplastic molding composition which comprises an intimate admixture of: (a) a polyethylene terephthalate and (b) a copolymer of a vinyl aromatic compound and an $\alpha,\beta$-unsaturated cyclic anhydride.

The blends of this invention have a heat deflection temperature of at least about 80° C., preferably above about 90° C., at 264 psi as measured by the ASTM procedure D 648–72. In still another preferred embodiment, the copolymer is a copolymer of a styrene, preferably styrene, and maleic anhydride. A further aspect of this invention is that the copolymer may be a rubber-modified copolymer.

DETAILED DESCRIPTION OF THE INVENTION

The polyethylene terephthalate used herein is preferably homopolymeric PET. Halogenated PET can also be used and is normally formed by condensation of a mixture of a halogenated, preferably brominated, terephthalic acid (e.g. 2,5-dibromoterephthalic acid and 2,3,5,6-tetrabromoterephthalic acid) and terephthalic acid with ethylene glycol. Additionally, the polyethylene terephthalate used herein can also contain up to 10 mol percent, relative to the acid component, of radicals of other aromatic dicarboxylic acids such as, for example, phthalic acid, isophthalic acid, naphthalene-2,6-dicarboxylic acid, diphenyl-4,4'-dicarboxylic acid and the like as well as their halogenated counterparts. The copolymers can also contain up to 10 mol percent, relative to the glycol component, of radicals of other glycols such as, for example, propylene glycol, butylene glycol, dibromoneopentyl glycol, bis(2-hydroxyethyl) ether of tetrabromobisphenol A and tetrabromo-p-xylylene glycol. See Kirk-Othmer, *Encyclopedia of Chemical Technology*, Second Edition, Vol. 16, pp. 161–173 (1968).

The polyethylene terephthalates used herein should be moldable, and in a preferred embodiment they have an intrinsic viscosity (I.V.) of between about 0.25 and 1.5, most preferably between about 0.5 and 1.2, as measured at 25° C. using 0.25 grams of polyester per 100 ml of a solvent consisting of 60 percent by weight phenol and 40 percent by weight of tetrachloroethane. For best results the polyethylene terephthalate should have an I. V. (measured in the foregoing manner) in the range of 0.4 to 1.2, more preferably between 0.5 and 1.1, and for most injection molding applications polyethylene terephthalates in which the I. V. is in the range of 0.5 to 0.9 are deemed most desirable.

The amount of polyethylene terephthalate resin used in the blends of this invention preferably falls within the range of from about 10 to about 90 weight percent based on the total weight of resin in the blend and the amount of the unsaturated cyclic anhydride copolymer falls within the range of from about 90 to about 10 weight percent also based on the total weight of resin in the blend. In a particularly preferred embodiment the relative amounts of the PET and the copolymer fall within the range of from about 20 to about 80 and from about 80 to about 20 weight percent respectively, the total being equal to 100. Most preferably the amounts used fall within the range of 30 to 70 and from about 70 to 30 weight percent, respectively.

Copolymers of a vinyl aromatic compound and an $\alpha,\beta$-unsaturated cyclic anhydride are well known in the art and are described in the literature. In general, they are prepared by conventional bulk or solution techniques using free-radical initiation. For example, styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, benzene or xylene is used.

Vinyl aromatic compounds of component (b) can be derived from compounds of the formula:

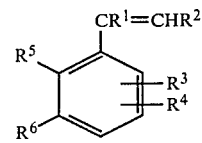

where $R^1$ and $R^2$ are selected from the group consisting of (lower) alkyl groups of from 1 to 6 carbon atoms and hydrogen; $R^3$ and $R^4$ are selected from the group consisting of chloro, bromo, hydrogen and (lower) alkyl of from 1 to 6 carbon atoms; $R^5$ and $R^6$ are selected from the group consisting of hydrogen and (lower) alkyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The cyclic anhydride compounds of component (b) are preferably α,β-unsaturated dicarboxylic anhydrides. For example the term cyclic anhydride identifies anhydrides having the formula:

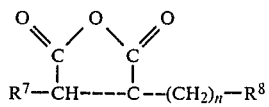

wherein the dashed lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms and n is an integer of from 0 to about 10. Examples include maleic anhydride, methyl maleic anhydride (citraconic anhydride), dimethyl maleic anhydride, itaconic anhydride, phenylmaleic anhydride, aconitic anhydride, and mixtures thereof. Maleic anhydride is the preferred anhydride of component (b). See also in this connection U.S. Pat. No. 4,107,149 and U.S. Pat. No. 4,113,797, full disclosure of each being incorporated herein by reference.

Copolymers of vinyl aromatic compounds and α,β-unsaturated cyclic anhydrides which can be used in the practice of this invention are described in U.S. Pat. Nos. 2,769,804, 2,971,939 and 3,336,267 the disclosures of which are incorporated herein by reference.

These copolymers can be rubber-free or rubber-modified copolymers. In preparing these rubber-modified copolymers use of such rubbers as polybutadiene, an isobutylene-isoprene copolymer, a styrene-butadiene copolymer, a butadiene-acrylonitrile copolymer, an ethylene-propylene copolymer, a polyisoprene, ethylene-propylenediene monomer terpolymers (EPDM) and the like can be employed. In this connection see U.S. Pat. No. 3,919,354 which is incorporated as if fully set forth herein.

Component (b) copolymers can comprise from about 40 to about 5 parts by weight of the α,β-unsaturated cyclic anhydride, from about 60 to about 95 parts by weight of a vinyl aromatic compound and from 0 to 50 parts by weight of rubber. Preferred polymers include those wherein the relative proportions of the styrene and the anhydride fall within the range of from about 90 to about 70 weight percent and from about 10 to about 30 weight percent, respectively. Preferred rubber-modified polymers used herein contain about 5–25 parts by weight of the α,β-unsaturated cyclic anhydride, 40–85 parts by weight of the vinyl aromatic compound, and from about 5 parts to about 30 parts by weight of rubber.

A preferred unmodified vinyl aromatic α,β-unsaturated cyclic anhydride copolymer useful in the composition of this invention is Dylark ® 332, supplied by ARCO/Polymers. Dylark ® 332 is a styrene-maleic anhydride copolymer (SMA) containing about 14 percent maleic anhydride, the balance being styrene. Still another preferred unmodified vinyl aromatic α,β-unsaturated cyclic anhydride copolymer is Dylark ® DKB 134, also made by ARCO/Polymers. This SMA copolymer contains about 17 percent maleic anhydride, the balance being styrene. A preferred rubber-modified vinyl aromatic α, β-unsaturated cyclic anhydride copolymer is Dow Experimental Resin XP-5272.07 made by Dow Chemical Company. This is a high impact styrene-maleic anhydride copolymer containing about 21.5 weight percent butadiene, about 21 weight percent maleic anhydride and about 57.5 weight percent styrene. Still another preferred rubber-modified copolymer is Dylark ® 350 (ARCO/Polymers) containing 15 percent by weight rubber, 11 percent maleic anhydride, with the balance being styrene. Still other preferred rubber-modified copolymers are identified in the Examples hereinafter. Typically such preferred graft copolymers will contain from 4 to 25 weight percent rubber, from 10 to 25 weight percent cyclic anhydride, and from 50 to 85 weight percent vinyl aromatic compound.

Compositions of this invention can also include other ingredients, such as flame retardants, extenders, processing aids, pigments, stabilizers and the like, for their conventionally employed purposes. Reinforcing fillers, in amounts sufficient to impart reinforcement, can be used, such as carbon filaments, silicates, such as acicular calcium silicate, asbestos, titanium dioxide, potassium titanate and titanate whiskers, glass flakes and fibers. Typical amounts ranging from about 5 to about 150% of the polymer blend may be employed, although variations from this range are permissible.

Particularly preferred compositions of this invention include those containing impact modifiers. Examples include ethylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), ABS, oxidized polyethylene, styrene-butadienestyrene (S-B-S) block copolymers, styrene/butadiene multiblock copolymers, styrene/butadiene radial block copolymers, hydrogenated S-B-S block copolymers, styrene/butadiene rubber, acrylic rubbers, EPDM, ethylene/acrylic acid copolymers, ethylene/methyl acrylate copolymers, ethylene/ethyl acrylate copolymers, polyester-ether multiblock copolymers, and the like. These materials are available in a wide range of molecular weights and it is generally desirable that the impact modifier, when used, has a melt viscosity close to that of the substrate. Amounts of impact modifiers generally fall within the range of from about 5 to about 40 percent by weight. The results obtained in any given situation will, of course, depend upon a variety of factors such as the impact modifier selected, the manner by which it is compounded into the blends, the concentration in which it is employed, and indeed upon the criteria used in measuring or judging the touchness of the resultant blend. On the basis of the work performed thus far, the most preferred impact modifiers are the polyether-ester segmented block copolymers, a number of which are available commercially from du Pont under the trademark Hytrel ®. The composition and synthesis of these copolyetherester block copolymers have been described in the literature—see for example U.S. Pat. Nos. 3,784,520, 3,766,146 and 3,763,109, the disclosures of which are incorporated herein by reference. Note also the text of U.S. Pat. No. 4,259,458 from Column 13, line 15 through Column 17, line 23 which likewise is incorporated herein by reference.

For protection against thermo-oxidative degradation, the customary amounts of stabilizers, preferably 0.001 to 0.5 percent by weight, relative to the unfilled and unreinforced compositions of this invention, can be added to the compositions according to the invention. Examples of suitable stabilizers are phenols and phenol derivatives, preferably sterically hindered phenols which contain alkyl substituents with 1-6 carbon atoms in the two positions ortho to the phenolic hydroxyl groups, amines, preferably secondary arylamines and their derivatives, phosphates and phosphites, preferably the aryl derivatives thereof and quinones. Non-limiting examples include 4,4'-bis(2,6-di-tert-butylphenol), 1,3,5-trimethyl-2,4,6-tris(3,5-di-tert-butyl-4-hydroxybenzyl)-benzene, 4,4'-butylidene-bis(6-tert-butyl-m-cresol), 3,4-di-tertbutyl-4-hydroxybenzyl-phosphonic acid diethyl ester, N,N'-bis-$\beta$-naphthyl)-p-phenylenediamine, N,N'-bis-(1-methylheptyl)-p-phenylenediamine, phenyl-$\beta$-naphthylamine, 4,4'-bis($\alpha,\alpha$-dimethylbenzyl)diphenylamine, hydroquinone, p-benzoquinone, toluhydroquinone, p-tert-butylpyrocatechol, chloranil and naphthoquinone.

Flame-retarding additives which can be used for the compositions according to the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are halogenated organic compounds (brominated or chlorinated), optionally used together with auxiliary compounds sometimes referred to as synergists, such as, for example antimony trioxide, zinc borate, or the like. Elementary phosphorus or phosphorus compounds such as ammonium polyphosphate are also preferred flame retardants. Other examples include bromine or chlorine containing organic phosphate esters, hexaphenoxy phosphazene, and the like. A particularly preferred flame retardant is the combination of ethylenebis(tetrabromophthalimide) and a synergist, preferably $Sb_2O_3$, in amounts of about 6 to 20 parts and about 2 to 10 parts, respectively, per 100 parts by weight of the resin.

Preferred reinforcing fillers are fiberglass, mineral fillers, particulate fillers such as mica and the like. In general, optimum physical properties can be obtained if glass filaments are employed in amounts of from about 5 to about 40 percent by weight, based on the combined weight of glass and resin. However, higher amounts can be used.

Compositions of the invention may be prepared by blending the components in a mixer (e.g. a Henschel mixer) and compounding the mixture on an extruder (e.g. a twin-screw 28 mm Werner-Pfleiderer extruder). Thereafter, the extrudate is chopped into pellets and molded on an injection molding machine.

The present invention is further illustrated in the following examples, which are not to be construed as limiting. All parts are by weight.

EXAMPLES 1 and 2

Compositions of the following examples were prepared by mixing the components to form a premix, compounding the premix on a screw extruder at temperatures at about 525° to 550° F. (274°-288° C.), and molding the pellets into test bars on a New Britain injection molding machine.

The particular materials used in these compositions were as follows:
a. Polyethylene terephthalate; from Goodyear Tire and Rubber Company; VFR 2977A-crystalline PET having an intrinsic viscosity of 0.68±0.025 as measured at 25° C. using 0.25 grams of polyester per 100 ml of a solvent consisting of 60 percent by weight phenol and 40 percent by weight of tetrachloroethane.
b. Styrene/maleic anhydride copolymer; from ARCO/Polymers; Dylark® DKB 134.

The PET/SMA copolymer weight:weight ratio in the blend of Example 1 was 70:30 and that of Example 2 was 60:40. Test bars of the above compositions were tested according to ASTM procedures to evaluate physical properties. The ASTM designation numbers for the properties measured were as follows:

| | |
|---|---|
| Specific Gravity | D 792-66 (1975); |
| Tensile-Yield, Elongation and Tensile Elastic Modulus | D 638-77a; |
| Flexural Strength and Flexural Elastic Modulus | D 790-71 (1978); |
| Izod Impact for ¼" bar, ⅛" bar and ⅛" bar at −40° C. | D 256-78; |
| Heat Deflection Temperature | D 648-72 (1978); |
| Vicat Softening Point | D 1525-76; |
| Rockwell Hardness | D 785-65 (1976). |

The results are shown in Table I.

TABLE I

| Property | Example 1 | Example 2 |
|---|---|---|
| Specific Gravity | 1.260 | 1.247 |
| Tensile-Yield, psi | 7310 | 7590 |
| Elongation, % | 1.6 | 2.0 |
| Tensile Elastic Modulus, $10^3$ psi | 470 | 447 |
| Flexural Strength, psi | 12,700 | 13,500 |
| Flexural Elastic Modulus, $10^3$ psi | 441 | 465 |
| Izod Impact, ¼" bar, ft.-lb./in. | 0.4 | 0.3 |
| Izod Impact, ⅛" bar, ft.-lb./in. | 0.4 | 0.3 |
| Izod Impact, ⅛" bar, ft.-lb./in. (at −40° C.) | 0.4 | 0.3 |
| Heat Deflection Temp. at 264 psi, °C. | 95 | 94 |
| Heat Deflection Temp. at 66 psi, °C. | 120 | 117 |
| Vicat Softening Point, °C. | 207 | 195 |
| Rockwell Hardness, R scale | 120 | 119 |

EXAMPLES 3-7

The following components were blended and molded as described in Examples 1 and 2.
a. Polyethylene terephthalate—Cleartuf 8502A; from the Goodyear Tire and Rubber Company having an intrinsic viscosity of 0.85 as measured at 25° C. using 0.25 grams of polyester per 100 ml of a solvent consisting of 60 percent by weight phenol and 40 percent by weight of tetrachloroethane.
b. Styrene/maleic anhydride copolymer; Dylark® 332 from ARCO/Polymers.

The proportions (weight percentages used were as follows:

| Components | Example | | | | |
|---|---|---|---|---|---|
| | 3 | 4 | 5 | 6 | 7 |
| A. PET | 70 | 55 | 40 | 25 | 10 |
| b. Styrene/Maleic Anhydride | 30 | 45 | 60 | 75 | 90 |

Physical property testing as in Examples 1 and 2 gave the results shown in Table II.

TABLE II

| Property | Example | | | | |
|---|---|---|---|---|---|
| | 3 | 4 | 5 | 6 | 7 |
| Tensile Yield, $10^3$ psi | 8.89 | 8.26 | 7.90 | 6.57 | 6.27 |
| Elongation, % | 2.8 | 2.1 | 1.8 | 2.8 | 1.4 |
| Tensile Modulus, $10^3$ psi | 434 | 456 | 482 | 497 | 424 |
| Flexural Strength, $10^3$ psi | 15.2 | 13.3 | 13.1 | 11.6 | 10.4 |
| Flexural Modulus $10^3$ psi | 441 | 455 | 473 | 480 | 485 |
| Notched Izod, $\frac{1}{8}$″ bar, ft.-lb./in. | 0.3 | 0.3 | 0.2 | 0.2 | 0.2 |
| Unnotched Izod, $\frac{1}{8}$″ bar, ft.-lb./in. | 6.8 | 5.4 | 3.8 | 2.8 | 2.0 |
| Heat Deflection Temp. at 264 psi, °C. | 84 | 105 | 105 | 109 | 110 |
| Heat Deflection Temp. at 66 psi, °C. | 110 | 122 | 121 | 120 | 121 |

EXAMPLES 8-12

Rubber-modified styrene/maleic anhydride copolymers were blended and molded in the same manner outlined in Examples 1 and 2. The following components were used:

a. Polyethylene terephthalate-Vituf® 5900; from Goodyear Chemical Company, having an intrinsic viscosity of 0.59 as measured at 25° C. using 0.25 grams of polyester per 100 ml of a solvent consisting of 60 percent by weight phenol and 40 percent by weight of tetrachloroethane.

b. Styrene/maleic anhydride copolymer; Dylark® 332 from ARCO/Polymers.

c. Rubber-modified styrene/maleic anhydride copolymer containing 15 percent rubber, 11 percent maleic anhydride, with the balance being styrene; Dylark® 350 from ARCO/Polymers.

d. Rubber-modified styrene/maleic anhydride copolymer containing 21.5 weight percent butadiene, 21 weight percent maleic anhydride and 57.5 weight percent styrene; Dow XP 5272.07 from Dow Chemical Company.

The proportions (weight percentages) used were as follows and the blends of Examples 8 and 9 were not rubber-modified:

| Components | Example | | | | |
|---|---|---|---|---|---|
| | 8 | 9 | 10 | 11 | 12 |
| a. PET | 70 | 55 | 66.7 | 50 | 60 |
| b. Styrene/Maleic Anhydride | 30 | 45 | None | None | None |
| c. Rubber-Modified Styrene/Maleic Anhydride | None | None | 33.3 | 50 | None |
| d. Rubber-Modified Styrene/Maleic Anhydride | None | None | None | None | 40 |

Physical property testing as in Examples 1 and 2 gave the results shown in Table III.

TABLE III

| Property | Example | | | | |
|---|---|---|---|---|---|
| | 8 | 9 | 10 | 11 | 12 |
| Notched Izod, $\frac{1}{8}$″ bar, ft.-lb./in. | 0.3 | 0.3 | 0.5 | 0.6 | 0.6 |
| Unnotched Izod, $\frac{1}{8}$″ bar ft.-lb./in. | 6.9 | 4.8 | 16.0 | 11.5 | 20.8 |
| Heat Deflection Temp. at 264 psi, °C. | 87 | 95 | 87 | 96 | 85 |
| Heat Deflection Temp. at 66 psi, °C. | 124 | 117 | 119 | 117 | 137 |

COMPARATIVE EXAMPLE

The PET used in Examples 8-12 was molded in the manner outlined in Examples 1 and 2. Physical property testing in accordance with the ASTM procedures of Examples 1 and 2 showed the neat PET to have a HDT of 76° C. at 264 psi, a HDT of 104° C. at 66 psi, a $\frac{1}{8}$ inch notched Izod Impact of 0.6 ft.-lb./in., a flexural strength of 15,200 psi and a flexural modulus of 400,000 psi.

EXAMPLES 13-15

Additional blends were made from the PET referred to in Examples 8-12 using either Dylark® 350 rubber-modified SMA or Dylark® 338S, a rubber-modified SMA containing about 4 weight percent rubber and 13.4 weight percent maleic anhydride with the balance being styrene. The makeup of the blends and their heat deflection temperatures at 264 psi (°C.) are shown in Table IV.

TABLE IV

| Example | Components | Wt. Percentage in Blend | Heat Deflection Temperature of Blend |
|---|---|---|---|
| 13 | PET | 50 | 87 |
| | Dylark 350 | 50 | |
| 14 | PET | 55 | 104 |
| | Dylark 338S | 45 | |
| 15 | PET | 50 | 100 |
| | Dylark 338S | 50 | |

EXAMPLES 16-19

Four blends were made using an SMA graft copolymer composed of about 16 weight percent maleic anhydride, 59 weight percent styrene and 25 weight percent rubber. The same PET as in Examples 8-12 was used. Table V gives the heat deflection temperatures at 264 psi (°C.) of the blends.

TABLE V

| Example | Wt. Percentage in Blend | Heat Deflection Temperature of Blend |
|---|---|---|
| 16 | 85/15 | 78 |
| 17 | 70/30 | 80 |
| 18 | 55/45 | 87 |
| 19 | 40/60 | 80 |

EXAMPLES 20-27

Eight blends were prepared using a PET from American Hoechst Company identified as Hoechst 018 and having an intrinsic viscosity (measured as above) of 0.60. In each case a mixture of two different SMA copolymers was used, one SMA being the rubber modified graft copolymer referred to in Examples 16-19, the other being either an unmodified copolymer containing 18 weight percent maleic anhydride (DKB-290) from ARCO/Polymers, Inc.) or Dylark ® 338S rubber-modified SMA (note Examples 14 and 15 above). Four of these blends were prepared by a double pass extrusion-compounding procedure in which the two SMA copolymers were blended together in the first-pass and the PET was added in the second-pass. Izod impact and heat deflection temperature (264 psi) data are given in Table VI.

TABLE VI

| | Example | | | | | | | |
|---|---|---|---|---|---|---|---|---|
| | 20 | 21 | 22 | 23 | 24 | 25 | 26 | 27 |
| Blend Composition, wt % | | | | | | | | |
| PET | 70 | 70 | 55 | 55 | 55 | 55 | 40 | 40 |
| SMA (EX. 16-19) | 20 | 20 | 30 | 30 | 30 | 30 | 40 | 40 |
| DKB-290 | 10 | — | 15 | 15 | — | — | 20 | — |
| Dylark ® 338S | — | 10 | — | — | 15 | 15 | — | 2- |
| Melt Compounding Method | | | | | | | | |
| Number of Passes | 2 | 2 | 1 | 2 | 1 | 2 | 1 | 1 |
| Properties | | | | | | | | |
| ¼" Notched Izod, ft.-lb./in. | 0.6 | 0.8 | 0.7 | 0.8 | 0.7 | 1.1 | 0.6 | 0.7 |
| ⅛" Unnotched Izod, ft.-lb./in. | 15.3 | 18.3 | 12.0 | 18.7 | 9.5 | 18.9 | 9.9 | 10.9 |
| HDT at 264 psi, °C. | 81 | 79 | 90 | 85 | 90 | 84 | 91 | 91 |

EXAMPLES 28–29

A pair of blends of this invention were formed from the Hoechst 018 PET and Dylark ® 338S rubber-modified SMA. One such blend additionally contained as an impact modifier a polyether ester segmented block copolymer containing approximately 50 mole percent soft (polyether) segments available commercially from du Pont under the trademark Hytrel ® 4056. Izod impact and heat deflection temperature (264 psi) data are given in Table VII.

TABLE VII

| | Example | |
|---|---|---|
| | 28 | 29 |
| Blend Composition, wt % | | |
| PET | 50 | 44 |
| Dylark ® 338S | 50 | 44 |
| Hytrel ® 4056 | — | 12 |
| Properties | | |
| ¼" Notched Izod, ft.-lb./in. | 0.5 | 1.1 |
| ⅛" Notched Izod, ft.-lb./in. | 0.5 | 1.1 |
| ⅛" Unnotched Izod, ft.-lb./in. | 11.4 | 26.0 |
| HDT at 264 psi, °C. | 99 | 89 |

EXAMPLES 30–33

Four PET/SMA blends were formed each containing Hytrel ® 4056 as an impact modifier. The PET's used were Goodyear Vituf ® 5900, Goodyear Cleartuf ® 7202A and Rohm & Haas X 5028-0.82 having intrinsic viscosities of 0.59, 0.72 and 0.82, respectively. The rubber-modified SMA's were Dylark ® 338S and Dylark ® 350. The makeup of the blends and their properties are summarized in Table VIII.

TABLE VIII

| | Example | | | |
|---|---|---|---|---|
| | 30 | 31 | 32 | 33 |
| Blend Composition wt % | | | | |
| PET (0.50 I.V.) | 40 | — | — | — |
| PET (0.72 I.V) | — | 40 | — | — |
| PET (0.82 I.V.) | — | — | 40 | 45 |
| Dylark ® 338S | 40 | 40 | 40 | — |
| Dylark ® 350 | — | — | — | 45 |
| Hytrel ® 4056 | 20 | 20 | 20 | 10 |
| Properties | | | | |
| Specific Gravity | 1.206 | 1.200 | 1.201 | 1.191 |
| Flexural Strength, 10³ psi | 10.1 | 10.1 | 10.6 | 9.8 |
| Flexural Modulus, 10³ psi | 277 | 295 | 303 | 299 |
| ¼" Notched Izod, ft -lb./in. | 1.2 | 1.1 | 1.2 | 1.3 |
| ⅛" Unnotched Izod, ft.-lb./in. | 20.6 | 25.7 | N.B.* | N.B.* |
| HDT, 264 psi, °C. | 90 | 88 | 88 | 82 |

*Did not break.

Various modifications of the invention are possible without departing from the scope of the invention as set forth in the claims.

We claim:

1. A composition comprising a blend of (I) polyester selected from the group consisting of a polyethylene terephthalate and at least 90 mole percent polyethylene terephthalate, and (II) a copolymer of a vinyl aromatic compound and an α,β-unsaturated cyclic anhydride, the weight ratio of the polyester to the copolymer in the blend is from about 90:10 to about 10:90 respectively, said composition having a heat deflection temperature of at least about 84° C. at 264 psi as measured by the ASTM procedure D 648-72.

2. A thermoplastic moldable blend of (I) polyester selected from the group consisting of polyethylene terephthalate and at least 90 mole percent polyethylene terephthalate and (II) a copolymer of a styrene and maleic anhydride, the weight ratio of the styrene to the anhydride being from about 90:10 to about 70:30, and the weight ratio of the polyester to the copolymer being from about 90:10 to about 10:90, the blend having a heat deflection temperature of at least about 90° C. at 264 psi as measured by the ASTM procedure D 648-72.

3. The composition of claim 2, further containing an impact modifier in an amount from about 5 to about 40 percent by weight.

4. The composition of claim 2, further containing a stabilizer to protect it against thermo-oxidative degradation, and also containing flame retardant.

5. The composition of claim 2, further containing from about 5 to about 40% by weight of a reinforcing filler.

6. A thermoplastic moldable intimate admixture of:
   (a) a polyethylene terephthalate, and
   (b) a copolymer consisting essentially of a vinyl aromatic compound and an α,β-unsaturated cyclic anhydride;

said composition having a heat deflection temperature of at least about 84° C. at 264 psi as measured by the ASTM procedure D 648-72.

7. A composition of claim 6 having a heat deflection temperature of at least about 90° C. at 264 psi as measured by the ASTM procedure D 648-72.

8. A composition of claim 6 wherein the vinyl aromatic compound is a styrene.

9. A composition of claim 6 wherein (b) is a copolymer of styrene and maleic anhydride.

10. A composition of claim 6 wherein the relative proportions of (a) and (b) fall within the range of from about 10 to about 90 weight percent of (a) with from about 90 to about 10 weight percent of (b), the total of (a) and (b) being equal to 100.

11. A composition of claim 6 wherein the relative proportions of (a) and (b) fall within the range of from about 20 to about 80 weight percent of (a) with from about 80 to about 20 weight percent of (b), the total of (a) and (b) being equal to 100.

12. A composition of claim 6 wherein said polyethylene terephthalate has an intrinsic viscosity of between about 0.5 and 1.2 as measured at 25° C. using 0.25 grams of polyester per 100 ml of a solvent consisting of 60 percent by weight phenol and 40 percent by weight of tetrachloroethane and wherein (b) consists essentially of styrene and maleic anhydride.

13. A composition of claim 12 wherein the relative proportions of said styrene and said anhydride fall within the range of from about 90 to about 70 weight percent and from about 10 to about 30 percent respectively.

14. A composition of claim 6 wherein the relative proportions of the vinyl aromatic compound and the anhydride in said copolymer fall within the range of from about 90 to about 70 weight percent and from about 10 to about 30 weight percent, respectively.

15. A composition of claim 6 wherein said polyethylene terephthalate has an intrinsic viscosity of between about 0.5 and 1.2 as measured at 25° C. using 0.25 grams of polyester per 100 ml of a solvent consisting of 60 percent by weight phenol and 40 percent by weight of tetrachloroethane; wherein the relative proportions of the vinyl aromatic compound and the anhydride in said copolymer fall within the range of from about 90 to about 70 weight percent and from about 10 to about 30 weight percent, respectively; and wherein said composition has a heat deflection temperature of at least about 90° C. at 264 psi as measured by ASTM procedure D 648-72.

16. A composition of claim 15 wherein the copolymer consists essentially of styrene and maleic anhydride and said intrinsic viscosity is between about 0.5 and 0.9.

17. A composition of claim 16 further including an impact modifier.

18. A composition of claim 6 in which the unsaturated anhydride is maleic anhydride.

* * * * *